United States Patent
Noldus et al.

(10) Patent No.: US 8,923,854 B2
(45) Date of Patent: Dec. 30, 2014

(54) METHOD OF AND EQUIPMENT FOR SUBSCRIBER MOBILITY REGISTRATION UPDATE IN A HOME LOCATION REGISTER OF A MOBILE COMMUNICATIONS NETWORK

(75) Inventors: Rogier August Caspar Joseph Noldus, Goirle (NL); Ralf Keller, Würselen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 745 days.

(21) Appl. No.: 13/141,213

(22) PCT Filed: Dec. 23, 2008

(86) PCT No.: PCT/EP2008/011072
§ 371 (c)(1),
(2), (4) Date: Jun. 21, 2011

(87) PCT Pub. No.: WO2010/072241
PCT Pub. Date: Jul. 1, 2010

(65) Prior Publication Data
US 2011/0256866 A1  Oct. 20, 2011

(51) Int. Cl.
*H04W 4/00* (2009.01)
*H04W 36/00* (2009.01)
*H04W 8/02* (2009.01)

(52) U.S. Cl.
CPC ..................................... *H04W 8/02* (2013.01)
USPC ................. 455/433; 455/432.1; 455/435.1; 455/436; 455/440; 455/560

(58) Field of Classification Search
CPC .......... H04W 8/02; H04W 8/04; H04W 8/08; H04W 8/12
USPC ............ 455/432.1, 433, 435.1, 436, 440, 560
See application file for complete search history.

(56) References Cited

U.S. PATENT DOCUMENTS

| | | | |
|---|---|---|---|
| 7,062,270 B1 * | 6/2006 | Dalvie et al. ................. | 455/433 |
| 7,840,213 B2 * | 11/2010 | Liu et al. ....................... | 455/433 |
| 2003/0027571 A1 * | 2/2003 | Karlsson et al. ............. | 455/433 |
| 2004/0072578 A1 * | 4/2004 | Keutmann et al. ......... | 455/456.1 |
| 2007/0032232 A1 * | 2/2007 | Bleckert et al. ............. | 455/433 |
| 2010/0009681 A1 * | 1/2010 | Schneyer et al. .......... | 455/435.1 |

FOREIGN PATENT DOCUMENTS

| WO | WO 2007/082551 A1 | 7/2007 |
|---|---|---|
| WO | WO 2008/122549 A | 10/2008 |

OTHER PUBLICATIONS

"3rd Generation Partnership Project; Technical Specification Group Core Network and Terminals, Mobile Application Part (MAP) specification;(Release 8)" 3GPP Draft, 29002-840 i 3rd Generation Partnership Project (3GPP), Mobile Competence Centre, 650, Route Des Lucioles ; F-06921 Sophia-Antipolis Cedex; France, vol. CT WG4, Dec. 19, 2007, XP050034034 p. 104, line 7—p. 115, line 5 p. 136 line 13—p. 147, line 17.

(Continued)

*Primary Examiner* — Wesley Kim

(57) ABSTRACT

A method of and equipment for subscriber mobility registration update in a Home Location Register, HLR, of a Global System for Mobile communications, GSM, or a Universal Mobile Telecommunications System, UMTS, mobile telecommunications network. The HLR receives and stores subscriber mobility registration information from at least one Mobile Switching Center, MSC, of the telecommunications network. The HLR instructs an MSC to forward intermediate subscriber mobility registration update messages to the HLR for specific mobility events of a subscriber. The HLR receives an intermediate subscriber mobility registration update message of the MSC when such a specific mobility event occurs, and the subscriber mobility registration in the HLR is updated on the basis of a received intermediate subscriber mobility registration update message by the HLR. The method is especially applicable for IP Multimedia Subsystem Centralized Services, ICS.

17 Claims, 3 Drawing Sheets

(56) References Cited

OTHER PUBLICATIONS

"Mobility and Security Management Ed Moul Y M; Pautet M-B" GSM System for Mobile Communications, Lassay-Les-Chateaux, Europe Media, FR, Jan. 1, 1993, pp. 432-498, XP000860007 p. 465, line 16—p. 470, line 36.

3G TS 23.078 v X.9.2 (Dec. 6, 1999); $3^{rd}$ Generation Partnership Project; Technical Specification Group Core Network; Customised Applications for Mobile network Enhanced Logic (CAMEL) Phase 3—Stage 2 (3G TS 23.078 version X.9.2 Release 1999).

* cited by examiner

METHOD OF AND EQUIPMENT FOR SUBSCRIBER MOBILITY REGISTRATION UPDATE IN A HOME LOCATION REGISTER OF A MOBILE COMMUNICATIONS NETWORK

TECHNICAL FIELD

The present invention relates generally to telecommunications and, more specifically, to subscriber mobility registration update in a Home Location Register, HLR, of a mobile telecommunications network, being a Global system for Mobile communications, GSM, or a Universal Mobile Telecommunications System, UMTS. The invention is particularly applicable for IP Multimedia System, IMS, services.

BACKGROUND OF THE INVENTION

In existing GSM or UMTS telecommunications networks, hereinafter generally referred to as GSM networks, GSM or UMTS subscribers from a given geographical area are attached to the network by a Mobile Switching Centre, MSC, which serves that area. When a GSM or UMTS subscriber, hereinafter generally referred to as subscriber, initially attaches to an MSC using a GSM or UMTS Mobile Station, MS, such as but not limited to a mobile telephone, a Personal Digital Assistant, PDA, or a laptop, the MSC initiates a Location Update procedure. The Location Update procedure involves updating the HLR of the subscriber by a suitable update message comprising the current location, in the form of an MSC address, of the subscriber. This Location Update procedure is hereinafter referred to as "initial" or "standard" or "regular" Location Update procedure, being the Location Update procedure known in the art. The update message, from the MSC to the HLR, initiating the Location Update procedure, is called an "initial subscriber mobility registration update message".

The HLR of a subscriber is a central database where information concerning the subscriber is stored, such as account numbers, features, preferences, permissions, etc. During the regular Location Update procedure the HLR is updated, by the MSC, with the address of the MSC to which the subscriber is attached. It is in turn the responsibility of the HLR to send GSM subscription data for that subscriber to the particular MSC. The information stored in the HLR is also used for various other services, such as detaching from the MSC, as will be appreciated by those skilled in the art.

If the subscriber "moves" to another MSC, e.g. by changing the geographical location and entering the area served by another MSC, the HLR is contacted and updated again by this other MSC. The HLR will now send subscription data to that other MSC and will instruct the previous MSC to remove the subscription data for that subscriber. This procedure, know in the art, is called an inter-MSC location area update. In this way, the HLR always comprises the MSC address where the subscriber is registered.

However, the subscriber may move from one location area to another location area within an MSC. Such change corresponds to a location area update within an MSC, called an intra-MSC location area update and does not result in a Location Update procedure to the HLR. Neither is detaching and attaching within an MSC notified to the HLR. Accordingly, in a GSM network the HLR has limited information about the specific geographical location of the subscriber, as well as the status (attached/detached) of the subscriber.

The aforementioned limited information results in limitations in functionality of the HLR in those cases where the location area of the subscriber and/or the status of the subscriber (attached/detached) plays a role. Examples of such cases include:

Terminating Call Handling:

The MSC address stored in the HLR is used for terminating call handling features. However, in some regions, such as the Caribbean, one MSC serves multiple countries (islands). Each country has one Base Station Controller, BSC, corresponding to one location area. Since in the HLR only the MSC address and not the location area is stored, the HLR cannot properly handle a terminating call, because the terminating call handling should correspond to a location area and not to the MSC.

IP Multimedia Subsystem Centralised Services, ICS:

If IP Multimedia System, IMS, services are offered to subscribers in the GSM network via IMS Centralised Services, ICS, the subscriber needs to be registered in the IMS network. This registration should be aligned with the status (attached/detached) of the subscriber. As this status is not always updated in the HLR, the HLR cannot handle the IMS registration/deregistration for the subscriber.

SUMMARY

It is an object of the present invention to provide an improved subscriber mobility registration update in a HLR of a GSM network, enabling the HLR to gather, store and provide up-to-date information regarding the subscriber, including his location area and status (attached/detached) and thus enhance the functionality of the HLR, especially for IMS Centralised Services.

It is a further object of the present invention to provide an HLR and MSC comprising equipment arranged for operating and supporting the improved subscriber mobility registration update.

A first aspect of the invention comprises a method of subscriber mobility registration update in a Home Location Register, HLR, of a Global System for Mobile communications, GSM, or a Universal Mobile Telecommunications System, UMTS, mobile telecommunications network, wherein the HLR receives and stores subscriber mobility registration information from at least one Mobile Switching Centre, MSC, of the telecommunications network. The method comprises the steps of:

instructing, by an HLR, an MSC to forward intermediate subscriber mobility registration update messages to the HLR for specific mobility events of a subscriber, receiving, by the HLR, an intermediate subscriber mobility registration update message of the MSC when such a specific mobility event occurs, and updating, by the HLR, the subscriber mobility registration in the HLR on the basis of a received intermediate subscriber mobility registration update message.

The invention provides for an enhanced update of the HLR by the MSC, based on instructions previously received from the HLR, for specific mobility events. A subscriber mobility registration update resulting from one of the specific mobility events is hereinafter called an "intermediate subscriber mobility registration update", this in contrast to the known "initial subscriber mobility registration update message", disclosed above.

The step of instructing preferably comprises specifying the specific mobility events, other than the initial mobility event, for which the MSC has to forward intermediate subscriber mobility registration update messages to the HLR.

In a further example of the invention, the MSC supports IP Multimedia Subsystem, IMS, services and the step of instructing by the HLR comprises providing IMS subscription information of the subscriber to the MSC and instructing registration of the IMS subscription information by the MSC.

According to another example, the HLR may instruct the MSC to forward intermediate subscriber mobility registration update messages for specific mobility events of a subscriber, only if required for the subscriber.

Preferably, the step of instructing is performed after receipt, by the HLR, of an initial subscriber mobility registration update message of an MSC.

In an other example, the method further comprises the step of initiating, by the HLR, an IP Multimedia Subsystem, IMS, registration or deregistration process with an IMS registration entity for a subscriber after receipt, by the HLR, of a subscriber mobility registration update message from an MSC.

In a second aspect, as far as the activity of an MSC is concerned, the invention provides a method of subscriber mobility registration update in a Home Location Register, HLR, of a Global System for Mobile communications, GSM, or a Universal Mobile Telecommunications System, UMTS, wherein the HLR receives and stores subscriber mobility registration information from at least one Mobile Switching Centre, MSC, of the telecommunications network, comprising the steps of:
  receiving, by an MSC, instructions of an HLR to forward intermediate subscriber location update messages to the HLR for specific mobility events of a subscriber,
  detecting, by the MSC, occurrence of such a specific mobility event, and
  forwarding, by the MSC, an intermediate subscriber mobility registration update message to the HLR when such specific mobility event occurs.

In a further example, the initial subscriber mobility registration update message from the MSC to the HLR may be enhanced by including at least any of the following information:
  whether the MSC supports forwarding of intermediate subscriber mobility registration update messages,
  whether the MSC supports IP Multimedia Subsystem, IMS, subscriber registration,
  current location information of a subscriber, and
  further subscriber mobility registration parameters relating to intermediate subscriber mobility registration update.

By providing enhanced initial subscriber mobility registration update information to the HLR, the HLR is able, based on this enhanced information, to instruct the MSC more specifically regarding the intermediate subscriber mobility registration update messages to be forwarded by the MSC.

In a further example the MSC forwards, to the HLR, in an intermediate subscriber mobility registration update message at least one of:
  a specification of the specific mobility event which has led to the forwarding of the intermediate subscriber mobility registration update message, and
  current location information of the subscriber.

In an example of the method, the MSC supports IP Multimedia Subsystem, IMS, services, and the method further comprises the step of initiating, by the MSC, an IMS registration or deregistration process of the subscriber after receipt, by the MSC, of IMS subscription information of the subscriber from the HLR.

In the method according to the invention, the mobility events preferably include at least one of a group comprising:
  intra-MSC location area location update,
  subscriber's attachment to the MSC,
  subscriber's detachment from the MSC.

As apparent from the above disclosure of the inventive method, the subscriber mobility registration update messages exchanged between the MSC and the HLR are enhanced, comparing to the prior art, in the sense that they comprise additional information. Consequently, new parameters need to be defined and included in the update messages to contain this additional information. Such parameters are referred to as "the newly defined parameters" throughout this specification and claims. They may be defined in the so-called MM-Code data type, which exists in Mobile Application Part, MAP, signalling.

In an example of the inventive method, Mobile Application Part, MAP, signalling is used in communications between the HLR and the MSC for exchanging subscriber mobility registration update messages and information. In the subscriber mobility registration update messages, known and newly defined parameters are placed behind the ellipsis character in the argument of the MAP message or behind the ellipsis character in the MAP result message, such that the communications are compatible to previous version(s) of the MAP message.

That is, using the MAP signalling in subscriber mobility registration update messages exchanged between the MSC and the HLR, and placing the known and newly defined parameters behind the ellipsis character, as a result, the messages—enhanced according to the inventive method—will be accepted and understood by all network nodes, including MSCs and HLRs, possibly using earlier version(s) of the MAP message, with the known and newly defined parameters just ignored and the rest of the message being handled, according to rules known in the art.

According to a further embodiment of the inventive method, the HLR serves as mobility node for the subscriber.

In an IP Multimedia Subsystem, IMS, the component corresponding to a HLR in a GSM system is called Home Subscriber Server, HSS, which combines the functionality of the HLR with gathering, storing and providing information specially required by the IMS network. It is thus to be understood that the invention equally applies to the Home Subscriber Server of an IP Multimedia Subsystem, in the case that the HLR is functionally included in the HSS. Consequently, in a preferred embodiment of the inventive method, the HLR is functionally included in a HSS of an IMS.

The invention covers also a Home Location Register, HLR, and a Mobile Switching Centre, MSC, both comprising equipment arranged for operating in accordance with the inventive method, as disclosed above.

According to the basic concept of the invention, the HLR may receive enhanced subscriber mobility registration update messages, in particular resulting from the mobility events including intra-MSC location area change, GSM attach and GSM detach. Consequently, information about such events may be stored in the HLR and used whenever needed, e.g. for proper terminating call handling (according to the subscriber's location area). It may also be used by the HLR for proper handling of an IMS registration of the subscriber, in the case that the GSM system offers to the subscriber network implementations requiring such registration. The network implementations include Multi Access Extension, MAE, and IMS Centralised Services, ICS.

Moreover, the HLR is capable of quickly handling Any Time Interrogation, ATI, related to the subscriber's location area or status. When receiving ATI, the HLR may retrieve the internally stored information, instead of having to obtain this information from the MSC.

Last but not least, it is worth mentioning that the present invention enables storing and retrieving information related to mobility events in a simpler and more useful manner than entailed by the CAMEL Phase 3 mobility management procedure. In particular, due to enhanced subscriber information stored in the HLR, the HLR may function as the mobility node (mobility gateway) for the subscriber.

The above-mentioned and other features and advantages of the invention will be best understood from the following description referring to the attached drawings.

In the drawings, like reference numerals denote identical parts and steps or parts and steps performing an identical or comparable function or operation.

BRIEF DESCRIPTION OF THE DRAWINGS

The present invention will be further described in details with reference to the enclosed drawing, in which.

DETAILED DESCRIPTION

The invention will now be explained in more details by the following examples, which are presented for illustrative purposes only and are not intended to limit the scope of the invention.

Figure 1:
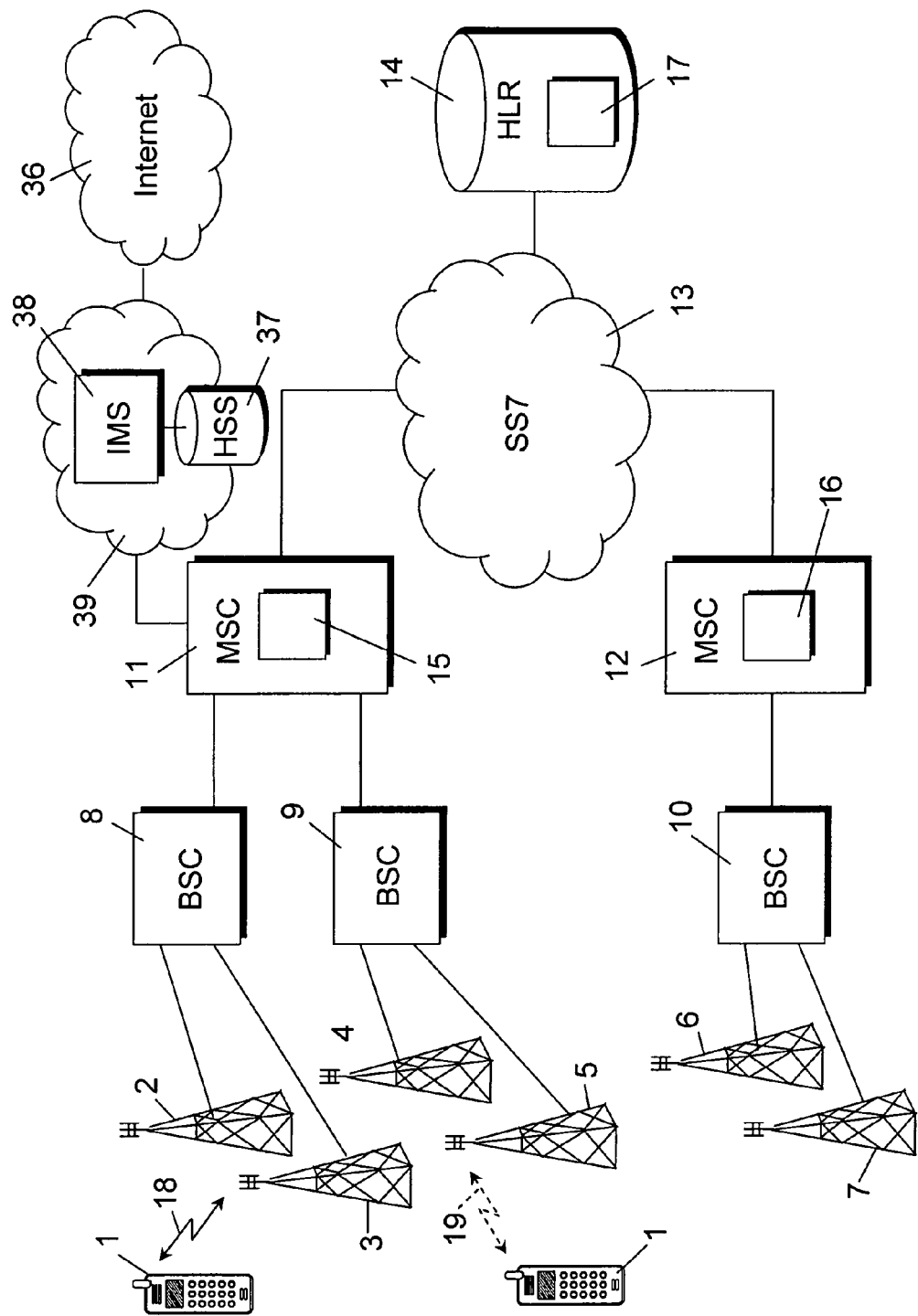
FIG. 1 shows, in a schematic and illustrative manner, a simplified mobile telecommunications network, arranged for supporting the present invention.

FIG. 1 shows, in a schematic and illustrative manner, a mobile telecommunications network, such as a Global System for Mobile Communications, GSM, or a Universal Mobile Telecommunications System, UMTS, mobile telecommunications network, arranged for supporting the present invention.

The mobile telecommunications network comprises a plurality of Radio Base Stations, RBS, or radio access stations 2, 3; 4, 5; 6, 7 which connect to a Base Station Controller, BSC, 8; 9; 10, respectively. The BSC 8, 9 connect to a Mobile Switching Centre, MSC, 11, and the BSC 10 connects to an MSC 12. The MSC 11, 12 connect via a signalling network 13, arranged for, among other, Mobile Application Part, MAP, signalling, to a Home Location Register, HLR, 14. The MSC 11 connects to an IP Multimedia System, IMS, registration entity 38 of an IMS network 39 which provides access to the Internet 36. The IMS network 39 comprises one or more Home Subscriber Server, HSS, 37 which combines the functionality of gathering, storing and providing information specially required by the IMS network 39.

A Mobile Station or Mobile Subscriber, MS, 1, such as a telephone handset or a multi-media communications terminal, or the like, connects via a radio connection 18 to an RBS 2, 3, 4, 5, 6, 7 for communication with an other MS, the Internet 36 or other telecommunications subscribers, among which subscribers of a fixed telecommunications network or other mobile telecommunications networks which connect to an MSC (not shown).

Those skilled in the art will appreciate that a practical mobile communications system may comprise a plurality of RBS, a plurality of MS, dependent on the extension and capacity of the telecommunications network, and a plurality of HLR and a plurality of MSC.

Each RBS 2, 3, 4, 5, 6, 7 serves a particular geographical area. When the MS 1 moves in the area serviced by the mobile telecommunications network, a call in progress will be handed over from one RBS to another. If the MS 1 moves from an area serviced by any of the RBS 2, 3 to an area serviced by any of RBS 4, 5, for example, the location of the MS 1 will be updated within the MSC 11, called, an Intra-MS location area update. When the MS 1 moves into an area serviced by any of the RBS 6, 7, the location update of the MS 1 involves a change of MSC address, i.e. from MSC 11 to MSC 12, also called an inter-MSC location update.

The MSC 11 and the MSC 12 and the HLR 14 comprise equipment 15, 16, 17, respectively, either hardware or software or a combination of both, arranged for supporting improved subscriber mobility registration update in the HLR 14 in accordance with the invention, the operation of which will be elucidated below by a number of examples.

Example 1

Enhanced Signalling During the Location Update Procedure

Figure 2:
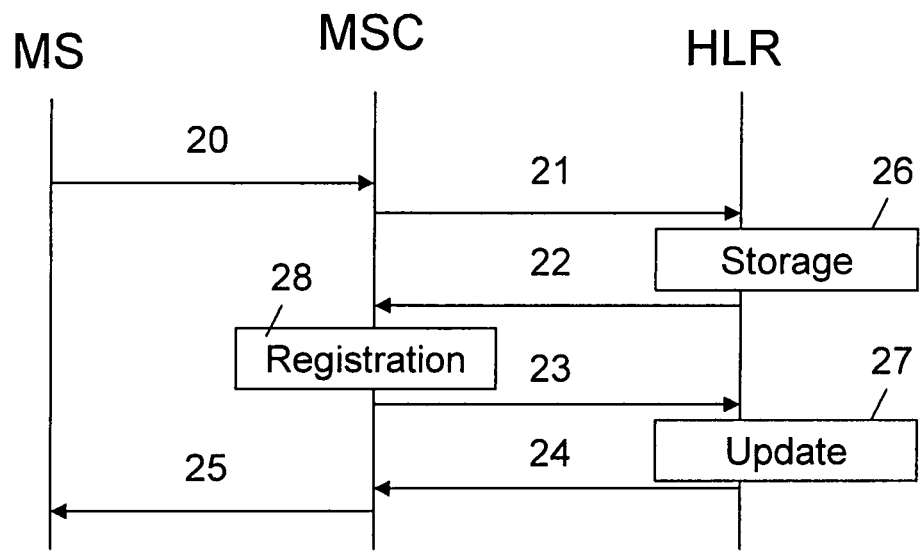
FIG. 2 shows, in a schematic and illustrative manner, an example of an enhanced signalling scenario between a subscriber, an MSC and an HLR in accordance with the invention, in the mobile telecommunications network of FIG. 1.

FIG. 2 shows, in a schematic and illustrative manner, an example of a signalling scenario involving subscriber mobile station MS 1, MSC 11 and HLR 14, in accordance with the invention, in the case of a location update for the subscriber. In this example MAP signalling is used between the MSC 11 and the HLR 14. In FIG. 2, the following steps are illustrated:

the MS 1 registers in the MSC 11 (message 20),
an initial subscriber mobility registration update message (message 21) is sent from the MSC 11 to the HLR 14, comprising the address of MSC 11 for storage 26 in the HLR 14,
the HLR 14 instructs the MSC 11 (message 22) to forward intermediate subscriber mobility registration update messages to the HLR 14 for selected mobility events,
when one or more of the selected mobility events occurs, the MSC 11 sends a corresponding intermediate subscriber mobility registration update message (message 23) to the HLR 14,
the HLR 14 updates 27 the subscriber mobility registration in the HLR on the basis of the received intermediate subscriber mobility registration update message 23, or messages in the event of a plurality of occurring selected mobility events,
in turn, appropriate update confirmation messages may be sent from the HLR 14 to the MSC 11 (message 24) and from the MSC 11 to the MS 1 (message 15).

In a particular example instruction message 22 is arranged such that the HLR 14 requests the MSC 11 to send intermediate subscriber mobility registration update messages whenever the subscriber switches his/her phone off (GSM detach). Message 22 may also include information on whether or not the MSC 11 should register 28 MS 1 in IMS 38.

With the message 21, the MSC 11 indicates to the HLR 14 that it supports intermediate subscriber mobility registration updates. In an example of the invention, the regular MAP Update location is enhanced to carry the above-mentioned additional information about supporting intermediate subscriber mobility registration updates. The Update location argument of message 21 may be enriched by adding the following known and/or newly defined parameters, see also 3GPP TS 29.002 v7.9.0:

cell global Id Or Service Area Id Or LAI: this parameter contains the current location of the subscriber; it is defined already in MAP;

intermediate Location Update Supported: this parameter indicates to the HLR that the MSC supports the intermediate subscriber mobility registration update procedures;

ims Registration Supported: this parameter indicates that the MSC supports the IMS registration procedure; if the HLR receives this parameter, it knows that the MSC takes care of registering the subscriber in the IMS; in such case, the HLR, nor any other network node, would need to take any further action for received intermediate subscriber mobility registration update messages and registering the subscriber; the IMS registration by the MSC is known to the person skilled in the art and is not further described in the present application, intermediate Location Update: this parameter contains information related to an intermediate location update procedure and will be further explained.

In the MAP signalling, the known and/or newly defined parameters for the Update location message 21 are placed behind the ellipsis, ' . . . ', character in the argument of the MAP message or behind the ellipsis in the MAP result message. This implies that the enhancement to the MAP protocol is backwards compatible (i.e. compatible to previous version(s) of the MAP message). The receiver of this message may discard parameters behind the ellipsis, if the receiver does not support these parameters.

When the MS 1 attaches to the MSC 11 for the first time, the MSC 11 performs an initial or regular location update procedure, with the enhancement as described above. In turn, the HLR 14 sends to the MSC 11 a message 22 instructing the MSC 11 to forward intermediate subscriber mobility registration update messages to the HLR for selected mobility events. The HLR 14 also indicates, for which events the MSC should send intermediate subscriber mobility registration update messages. Message 22 may be included in the MAP Update location result, which is for that purpose enriched by adding the following parameters:

requested-mobility-events: this parameter indicates to the MSC for which mobility events the MSC should send intermediate subscriber mobility registration update messages to the HLR;

ims Subscriber this parameter indicates to the MSC that the subscriber is an IMS subscriber. The HLR may include this parameter only if the MSC has indicated that it supports the IMS registration. When the MSC receives this parameter in the Update location result, it should perform IMS registration for the subscriber. If the Update location result relates to an intermediate subscriber mobility registration update or to an inter-MSC location update, then the subscriber is likely already IMS-registered. When the HLR then instructs the MSC to register the subscriber, then this IMS registration should overwrite the existing IMS registration;

register Subscriber this parameter indicates to the MSC that the MSC should perform IMS registration for the subscriber.

The HLR 14 may request an intermediate subscriber mobility registration update message for one or more of the events defined in the MM-Code data type, which exists in MAP. For the intermediate Update location messages (which constitute a subset of intermediate subscriber mobility registration update messages), the following events are used:

Location-update-in-the-same-Visitor Location Register,
International Mobile Subscriber Identity (IMSI)-Attach,
MS-initiated-IMSI-Detach,
Network-initiated-IMSI-Detach.

The newly defined parameters for the Update location message result are placed behind the ellipsis in the argument of the MAP message or behind the ellipsis in the MAP result message; this implies that this enhancement to the MAP protocol is also backwards compatible.

Similar to the initial subscriber mobility registration update message 21, the intermediate subscriber mobility registration update message 23 may also be enhanced by adding the parameter intermediate Location Update to the argument. This parameter is defined as follows:

```
IntermediateLocationUpdate ::= SEQUENCE {
    mobilityEvent [0] MM-Code       OPTIONAL,
    extensionContainer [2] ExtensionContainer    OPTIONAL,
    ...}
```

The following parameters may be contained in IntermediateLocationUpdate:

mobilityEvent: this parameter indicates which mobility event led to the intermediate subscriber mobility registration update procedure. It is defined as MM-Code.

The intermediate subscriber mobility registration update message 23 may comprise also the location information, contained in cellGloballdOrServiceAreaOrLAI.

When the HLR 14 receives the MAP intermediate subscriber mobility registration update message 23, it deduces, by virtue of the presence of the intermediateLocationUpdate parameter, that this is an intermediate subscriber mobility registration update message, as opposed to an initial regular subscriber mobility registration update message.

The enhanced features described above may be used selectively. In such case, the HLR 14 instructs the MSC 11 to send intermediate subscriber mobility registration update messages only when such messages are actually needed for this subscriber. For other subscribers, the HLR 14 will request and receive only the regular subscriber mobility registration update messages. It will be appreciated that the update step 27 may be performed each time an intermediate subscriber mobility registration update message is received.

Example 2

Figure 3:
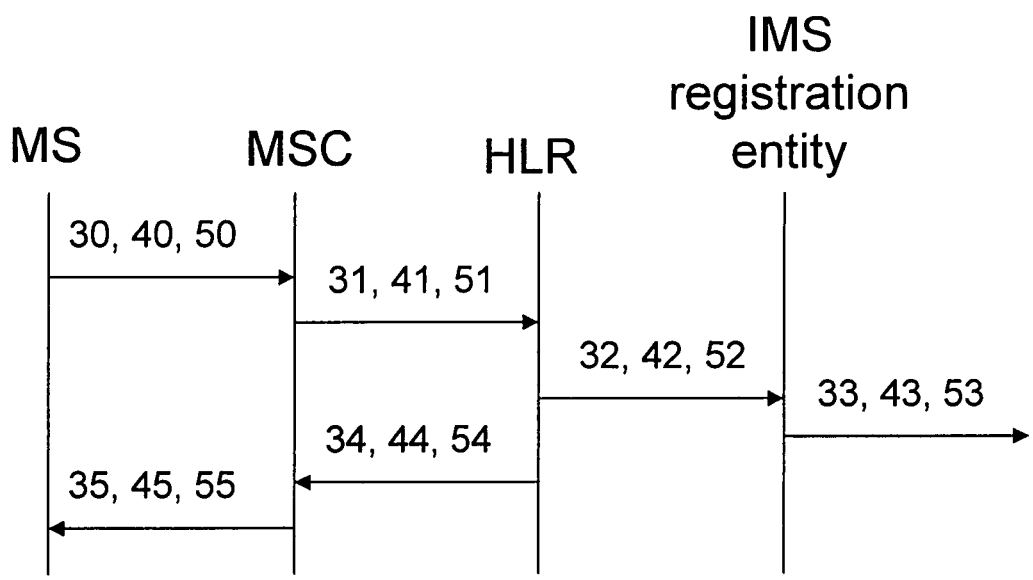
FIG. 3 shows, in a schematic and illustrative manner, enhanced signalling scenarios between a subscriber, an MSC, an HLR and an IMS registration entity for a GSM detach followed by IMS deregistration, for a GSM attach, followed by IMS registration, and for an intra-MSC location update followed by IMS re-registration, respectively, in accordance with the invention, in the mobile telecommunications network of FIG. 1.

IMS Deregistration Handled by the HLR, Resulting from Switching Off the Mobile Station, MS FIG. 3 shows, in a schematic and illustrative manner, an enhanced signalling scenario involving the MS 1, the MSC 11, the HLR 14 and an IMS registration entity 38, in accordance with the invention.

In the case that MS 1 is switched off, the MSC 11 is notified about it (message 30). Then the MSC 11 sends to the HLR 14 an intermediate subscriber mobility registration update message 31, according to the request from the HLR 14 received during the initial registration (as discussed in Example 1 above). In turn, the HLR 14, using the message 31, informs the IMS registration entity 38 that the MS 1, or the subscriber, is detached (message 32). The subscriber is now de-registered from IMS (message 33). Finally, appropriate update confirmation messages may be sent from the HLR 14 to the MSC 11 (message 34) and from the MSC 11 to the MS 1 (message 35).

The intermediate subscriber mobility registration update message resulting from Detach does not include location information, as explained in Example 1. Moreover, the MSC indicates in the intermediate subscriber mobility registration update message 31 that it supports the IMS registration and intermediate subscriber mobility registration updates.

According to an example of the invention, the HLR 14 has to indicate in every update location result message, whether it wants the MSC 11 to send intermediate subscriber mobility registration update messages. If the HLR 14 does not include such request in the Update location result message, the MSC 11 will cease to send intermediate subscriber mobility registration update messages.

Example 3

IMS Registration Handled by the HLR, Resulting from Switching on the Mobile Station, MS In the case that the subscriber's Mobile Station, MS 1, is switched on again, which is also illustrated in FIG. 3, the MSC 11 is notified about it (message 40). Then the MSC 11 sends to the HLR 14 an intermediate subscriber mobility registration update message 41, according to the request from the HLR 14 during the initial registration (as discussed in Example 1). In turn, the HLR 14 using the message 41, informs the IMS registration entity 38 that the MS 1, i.e. the subscriber, is attached (message 42). The subscriber is now registered in IMS (message 43). Finally, appropriate update confirmation messages may be sent from the HLR 14 to the MSC 11 (message 44) and from the MSC 11 to the MS 1 (message 45).

In this case, the intermediate subscriber mobility registration update message 41 from the MSC 11 to the HLR 14 includes location information, in the form of the Cell Global Identifier, CGI.

Example 4

IMS Re-Registration Handled by the HLR, Resulting from Intra-MSC Location Change In the case that the subscriber changes location within an MSC 11 (intra-MSC location change), that is when the subscriber is, resulting from the change of location, served by another BSC, for example BSC 9 instead of BSC 8, both being connected to MSC 11, for example, which is schematically indicated by a dashed arrow 19 in FIG. 1, several signalling messages are exchanged as illustrated in FIG. 3. The MSC 11 is notified about this (message 50). It shall be understood by the person skilled in the art that the message 50, being sent from MS 1 to MSC 11, traverses RBS and BSC. Then the MSC 11 sends to the HLR 14 an intermediate subscriber mobility registration update message 51, according to the request received from the HLR 14 during the initial registration (as discussed in Example 1 above). In turn, the HLR 14, using the message 51, informs the IMS registration entity 38 that the subscriber has changed its location (message 52). The subscriber is now re-registered in IMS (message 53) with the new location. Finally, appropriate update confirmation messages may be sent from the HLR 14 to the MSC 11 (message 54) and from the MSC 11 to the MS 1 (message 55).

In this case, the intermediate subscriber mobility registration update message 51 from the MSC 11 to the HLR 14 includes location information, in the form of the Cell Global Identifier, CGI.

Example 5

Enhanced Signalling During an Intra-MSC Location Update for a Multi-Zone MSC

Figure 4:
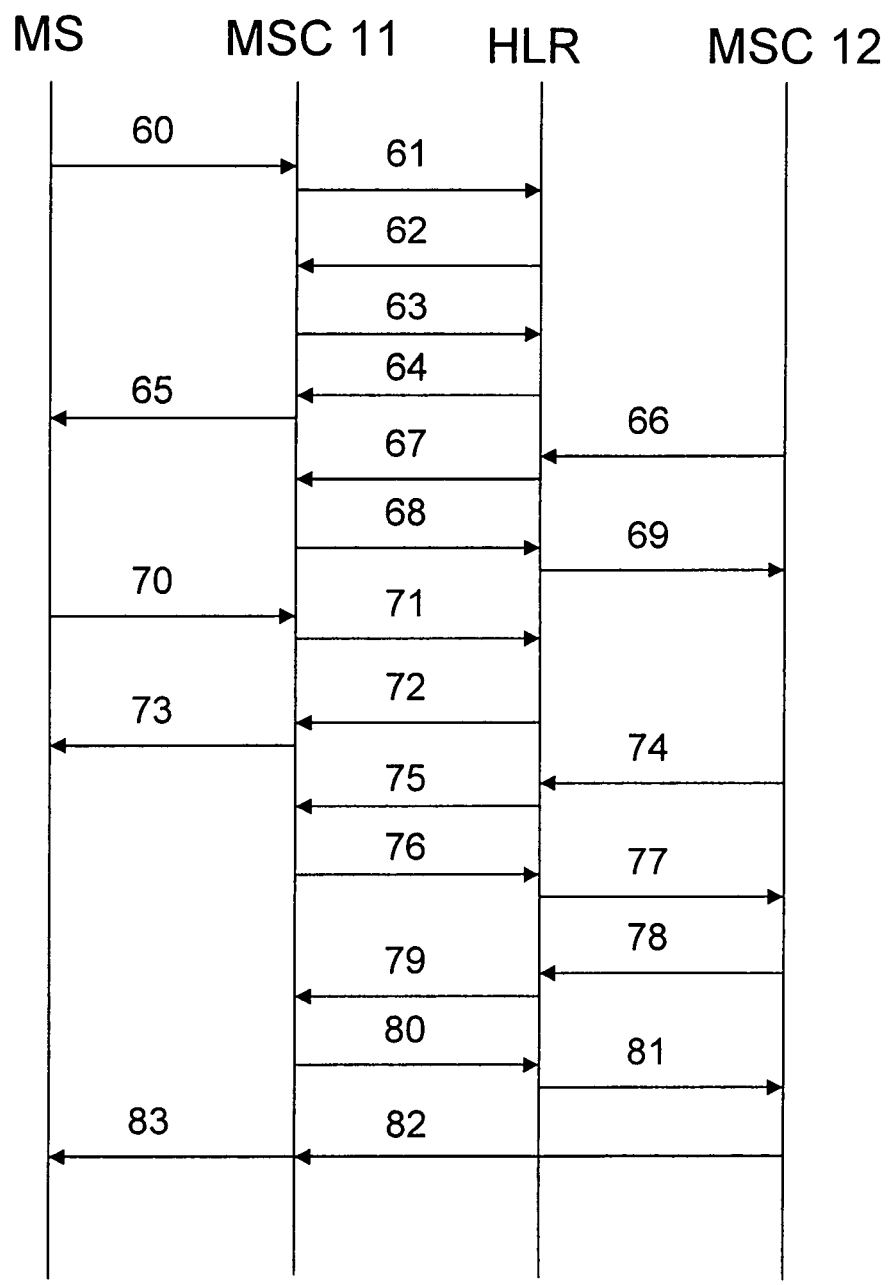
FIG. 4 shows in a schematic and illustrative manner, an example of an enhanced signalling scenario between a subscriber, a first MSC, a second MSC and an HLR for an intra-MSC location update for a multi-zone MSC, enhanced in accordance with the invention, in the mobile telecommunications network of FIG. 1.

FIG. 4 shows in a schematic and illustrative manner, an enhanced signalling scenario between the subscriber's Mobile Station, MS 1, a first MSC 11, a second MSC 12, and the HLR 14, according to the invention. In this case, an intra-MSC location update takes place within MSC 11, wherein MSC 11 serves multiple charging zones, i.e. is a multi-zone MSC.

It is assumed that at first the subscriber registers to the MSC 11, while being outside his home location area. Then the regular location update procedure, enhanced as described in Example 1, takes place illustrated by messages 60, 61, 62, 63, 64, 65 in FIG. 4 corresponding to messages 20, 21, 22, 23, 24, 25 in FIG. 1, respectively.

When a notification 66 about an incoming call is received by the HLR 14 from the MSC 12, this incoming call is barred, because the MS 1 is not within its home location area, following messages 67, 68, 69 in FIG. 4. In one embodiment of the invention, messages 67 and 68 may not be needed, since the HLR has sufficient information to know whether the called subscriber currently resides in her home location area or not. This knowledge is gathered by HLR due to the afore described intermediate Location update messages.

However, later on the MS 1 changes location from the present location area to another location area, being its home location area, while staying within the range of MSC 11 (an intra-MSC location change). MSC 11 is notified about this (message 70). According to the initial request 62 from the HLR 14, the MSC 11 sends an intermediate subscriber mobility registration update message 71 to the HLR 14, including the subscriber's new location information. The information in the HLR 14 is updated accordingly and appropriate confirmation messages are sent back from the HLR 14 to the MSC 11 (message 72) and from the MSC 11 to the subscriber's MS 1 (message 73).

When another notification 74 about an incoming call for the subscriber is received by the HLR 14 from the MSC 12, this incoming call is allowed to be established, because this time the MS 1 is within its home location area, involving suitable registration and confirmation messages 75, 76, 77, 78, 79, 80, 81. Reference numerals 82, 83 represent the continuation of the call establishment, i.e. between MSC 12 and MSC 11, and between MSC 11 and MS 1, respectively.

Generally, when the HLR receives an incoming call for the subscriber MS (MAP Send Routing Information, SRI), the HLR can determine, based on the subscriber's current location area stored in the HLR, whether the subscriber is within his home location area or not. Based on that, the HLR may decide whether CAMEL terminating call handling shall apply for the call.

The present invention is not limited to the embodiments as disclosed above, and can be modified and enhanced by those skilled in the art beyond the scope of the present invention as disclosed in the appended claims without having to apply inventive skills.

The invention claimed is:

1. A method of subscriber mobility registration update in a Home Location Register (HLR) of a Global System for Mobile communications (GSM) or a Universal Mobile Telecommunications System (UMTS) mobile telecommunications network, wherein the HLR receives and stores subscriber mobility registration information from at least one Mobile Switching Centre (MSC) of the telecommunications network, the method comprising the steps of:
- instructing, by an HLR, an MSC to forward intermediate subscriber mobility registration update messages to the HLR for specific mobility events of a subscriber,
- receiving by the HLR, an intermediate subscriber mobility registration update message of the MSC when such a specific mobility event occurs, and
- updating, by the HLR, the subscriber mobility registration in the HLR on the basis of a received intermediate subscriber mobility registration update message.

2. The method according to claim 1, wherein the step of instructing comprises specifying the specific mobility events for which the MSC has to forward intermediate subscriber mobility registration update messages to the HLR.

3. The method according to claim 1, wherein the MSC supports IP Multimedia Subsystem (IMS) services and wherein the step of instructing by the HLR comprises providing IMS subscription information of said subscriber to the MSC and instructing registration of said IMS subscription information by the MSC.

4. The method according to claim 1, wherein the HLR instructs the MSC to forward intermediate subscriber mobility registration update messages for specific mobility events of a subscriber only if required for the subscriber.

5. The method according to claim 1, wherein the step of instructing is performed after receipt, by the HLR, of an initial subscriber mobility registration update message of an MSC.

6. The method according to claim 1, further comprising the step of initiating, by the HLR, an IP Multimedia Subsystem (IMS) registration or deregistration process with an IMS registration entity for a subscriber after receipt, by the HLR, of a subscriber mobility registration update message from an MSC.

7. The method according to claim 1, wherein the mobility events include at least one of a group comprising:
- intra-MSC location area location update,
- subscriber's attachment to the MSC, and
- subscriber's detachment from the MSC.

8. The method according to claim 1, wherein Mobile Application Part (MAP) signalling is used in communications between the HLR and the MSC for exchanging subscriber mobility registration update messages and information, including known or newly defined parameters.

9. The method according to claim 8, wherein in subscriber mobility registration update messages the known or newly defined parameters are placed behind the ellipsis character in the argument of said MAP signalling message or behind the ellipsis character in said MAP signalling message result, such that said communications are compatible to previous version(s) of the MAP signalling message.

10. The method according to claim 1, wherein the HLR serves as mobility node for said subscriber.

11. The method according to claim 1, wherein the HLR is functionally included in a Home Subscriber System (HSS) of an IP Multimedia Subsystem (IMS).

12. A method of subscriber mobility registration update in a Home Location Register of a Global System for Mobile communications (GSM) or a Universal Mobile Telecommunications System (UMTS) mobile telecommunications network, wherein the HLR receives and stores subscriber mobility registration information from at least one Mobile Switching Centre (MSC) of the telecommunications network, the method comprising the steps of:
- receiving, by an MSC, instructions of an HLR to forward intermediate subscriber location update messages to the HLR for specific mobility events of a subscriber,
- detecting, by the MSC, occurrence of such a specific mobility event, and
- forwarding, by the MSC, an intermediate subscriber mobility registration update message to the HLR when such specific mobility event occurs.

13. The method according to claim 12, wherein the MSC forwards, to the HLR, in an initial subscriber mobility registration update message at least one of:
- whether the MSC supports forwarding of intermediate subscriber mobility registration update messages,
- whether the MSC supports IP Multimedia Subsystem (IMS) subscriber registration,
- current location information of a subscriber, and
- further subscriber mobility registration parameters relating to intermediate subscriber mobility registration update.

14. The method according to claim 12, wherein the MSC forwards, to the HLR, in an intermediate subscriber mobility registration update message at least one of:
- a specification of the specific mobility event which has led to the forwarding of the intermediate subscriber mobility registration update message, and
- current location information of the subscriber.

15. The method according to claim 12, wherein the MSC supports IP Multimedia Subsystem (IMS) services, further comprising the step of initiating, by the MSC, an IMS registration or deregistration process of the subscriber after receipt, by the MSC, of IMS subscription information of said subscriber from the HLR.

16. A Home Location Register HLR) arranged for operating in a Global System for Mobile communications (GSM) or a Universal Mobile Telecommunications System (UMTS) mobile telecommunications network comprising at least one Mobile Switching Centre (MSC), the HLR comprising:
- a processor; and
- a memory containing instructions that, when executed by the processor, cause the HLR to:
  - instruct an MSC to forward intermediate subscriber mobility registration update messages to the HLR for specific mobility events of a subscriber, the specific mobility events being specified by the HLR,
  - receive intermediate subscriber mobility registration update messages of the MSC when such specific mobility events occur, and
  - update a subscriber mobility registration in the HLR on the basis of a received intermediate subscriber mobility registration update message.

17. A Mobile Switching Centre (MSC) arranged for operating in a Global System for Mobile communications (GSM) or a Universal Mobile Telecommunications System (UMTS) mobile telecommunications network, comprising at least one Home Location Register (HLR), the MSC comprising:
- a processor; and
- a memory containing instructions that, when executed by the processor, cause the MSC to:
  - receive instructions from an HLR to forward intermediate subscriber location update messages to the HLR for specific mobility events of a subscriber,
  - detect occurrence of such a specific mobility event, and
  - forward an intermediate subscriber mobility registration update message to the HLR when such specific mobility event occurs.

* * * * *

UNITED STATES PATENT AND TRADEMARK OFFICE
CERTIFICATE OF CORRECTION

PATENT NO. : 8,923,854 B2  
APPLICATION NO. : 13/141213  
DATED : December 30, 2014  
INVENTOR(S) : Noldus et al.

Page 1 of 1

It is certified that error appears in the above-identified patent and that said Letters Patent is hereby corrected as shown below:

On the title page item 56, under "OTHER PUBLICATIONS", in Column 2, Line 3, delete "Draft," and insert -- Draft; --, therefor.

In the specification

In Column 7, Line 53, delete "ims Subscriber" and insert -- IMS Subscriber: --, therefor.

In Column 7, Line 65, delete "register Subscriber" and insert -- register Subscriber: --, therefor.

In the claims

In Column 11, Line 62, in Claim 12, delete "Register" and insert -- Register (HLR) --, therefor.

Signed and Sealed this
Seventeenth Day of May, 2016

Michelle K. Lee
*Director of the United States Patent and Trademark Office*